United States Patent
Claussen et al.

(10) Patent No.: US 10,052,671 B2
(45) Date of Patent: Aug. 21, 2018

(54) METHOD FOR PRODUCING A TORSIONAL PROFILE FROM A TUBULAR HOLLOW PROFILE, AND TORSIONAL PROFILE

(71) Applicant: BENTELER AUTOMOBILTECHNIK GMBH, Paderborn (DE)

(72) Inventors: Lars Claussen, Bad Lippspringe (DE); Goddy Hutabarat, Paderborn (DE); Jan Krull, Schlangen (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 362 days.

(21) Appl. No.: 14/790,713

(22) Filed: Jul. 2, 2015

(65) Prior Publication Data
US 2016/0001341 A1   Jan. 7, 2016

(30) Foreign Application Priority Data
Jul. 7, 2014   (DE) .................. 10 2014 109 453

(51) Int. Cl.
*B21D 7/06* (2006.01)
*B21D 22/02* (2006.01)
(Continued)

(52) U.S. Cl.
CPC ............. *B21D 7/06* (2013.01); *B21D 22/025* (2013.01); *B21D 53/88* (2013.01); *B60G 21/051* (2013.01);
(Continued)

(58) Field of Classification Search
CPC ........ B21D 7/06; B21D 22/025; B21D 53/88; B60G 21/051
See application file for complete search history.

(56) References Cited

U.S. PATENT DOCUMENTS

| 4,739,918 A | 4/1988 | Stokes et al. |
| 6,523,841 B2 | 2/2003 | Glaser et al. |

(Continued)

FOREIGN PATENT DOCUMENTS

| DE | 196 53 959 C1 | 2/1998 | |
| DE | 10054692 A1 * | 5/2002 | ........... B60G 21/051 |

(Continued)

OTHER PUBLICATIONS

Machine translation of JP 2008-169455 (Year: 2008).*
Machine translation of DE 10054692 (Year: 2002).*
U.S. Appl. No. 14/794,627, filed Jul. 8, 2015, Friesen et al.

*Primary Examiner* — John E Uselding
(74) *Attorney, Agent, or Firm* — Sheridan Ross, P.C.

(57) ABSTRACT

A method for producing a torsional profile from a tubular hollow profile, the torsional profile being provided, over its entire length, with spaced-apart walls, is provided. The method includes placing the tubular hollow profile into a first deformation die, positioning the ends of the tubular hollow profile in the first deformation die by means of in each case one tapering first mandrel which extends into a torsional region, positioning the tubular hollow profile over its longitudinal extent in the first deformation die, deforming the tubular hollow profile over its longitudinal extent in the torsional region by means of a first punch, with a reduction in the tube cross-sectional area in the torsional region, and removing the first punch and the first mandrels.

12 Claims, 3 Drawing Sheets

(51) Int. Cl.
*B21D 53/88* (2006.01)
*B60G 21/05* (2006.01)

(52) U.S. Cl.
CPC .... *B60G 2200/21* (2013.01); *B60G 2206/202* (2013.01)

(56) References Cited

U.S. PATENT DOCUMENTS

| | | |
|---|---|---|
| 6,616,157 B2 | 9/2003 | Christophliemke et al. |
| 2002/0005622 A1 | 1/2002 | Glaser et al. |
| 2002/0105159 A1 | 8/2002 | Christophliemke et al. |
| 2003/0044632 A1 | 3/2003 | Schonleber et al. |
| 2006/0059974 A1* | 3/2006 | Park ............... B21D 41/045 72/398 |
| 2007/0052194 A1 | 3/2007 | Marchel |
| 2007/0075518 A1 | 4/2007 | Murata |

FOREIGN PATENT DOCUMENTS

| | | | |
|---|---|---|---|
| DE | 101 02 759 A1 | 7/2002 | |
| DE | 10 2007 002 448 A1 | 7/2008 | |
| DE | 10 2007 002 449 B4 | 7/2008 | |
| DE | 10 2008 052 554 A1 | 4/2010 | |
| DE | 10 2009 031 981 A1 | 8/2010 | |
| EP | 0 752 332 B1 | 1/1997 | |
| EP | 1036678 | 9/2009 | |
| JP | 2001-146110 | 5/2001 | |
| JP | 2005-162080 | 6/2005 | |
| JP | 2008169455 A * | 7/2008 | ............... C21D 7/02 |
| WO | WO-2010043036 A1 * | 4/2010 | ............... B21C 1/24 |

\* cited by examiner

METHOD FOR PRODUCING A TORSIONAL PROFILE FROM A TUBULAR HOLLOW PROFILE, AND TORSIONAL PROFILE

CROSS-REFERENCE TO RELATED APPLICATIONS

This application claims the benefit of German Patent Application No. DE 10 2014 109 453.0, filed Jul. 7, 2014, the entire contents of which are incorporated herein by reference.

FIELD

The invention relates to a method for producing a torsional profile from a tubular hollow profile, and to a torsional profile.

BACKGROUND

EP 0 752 332 B1 and DE 196 53 959 C1 has disclosed methods in which a torsional profile is produced from a tubular hollow profile. In said method, a tubular hollow profile is deformed, over the major part of its length, to form a torsional which is recessed in U-shaped or V-shaped fashion in cross section. In this case, the walls of the torsional profile come to bear against one another in the torsional section which is recessed in U-shaped or V-shaped fashion in cross section, in such a way that said walls are in contact with one another over the entire torsional section. Torsional profiles produced in this way duly have adequate torsional strength, in particular for automotive applications, such as is required in particular in safety-relevant areas in the automotive sector for such torsional profiles. However, such torsional profiles have inherent in them the undesired characteristic that, under torsional load, under some circumstances, undesired noise is generated as a result of the inner and outer walls of the torsional profile rubbing against one another in the torsional region. Said noises may in this case lie in a frequency range which is unpleasant or even harmful to human hearing, such that torsional profiles of said type are not suitable for comfortable operation of a motor vehicle.

SUMMARY

Embodiments of the disclosure provide a method for producing a torsional profile from a tubular hollow profile, and to provide a torsional profile in which undesired generation of noise does not occur.

The method according to the invention for producing a torsional profile from a tubular hollow profile, the torsional profile being provided, over its entire length, with spaced-apart walls, has the following method steps:

a) placing the tubular hollow profile into a first deformation die,
b) positioning the ends of the tubular hollow profile in the first deformation die by means of in each case one tapering first mandrel (4, 5) which extends into a torsional region,
c) positioning the tubular hollow profile over its longitudinal extent in the first deformation die,
d) deforming the tubular hollow profile over its longitudinal extent in the torsional region by means of a first punch, with a reduction in the tube cross-sectional area in the torsional region,
e) removing the first punch and the first mandrels.

Before the deformation of the tubular hollow profile to form the torsional profile can be performed, said tubular hollow profile is placed into the first deformation die, and the ends thereof are fixed in each case by means of a tapering mandrel which extends into a torsional region, wherein said mandrels are preferably arranged on corresponding holders. In order that the tubular hollow profile is arranged securely in the deformation die before its deformation, it is preferably also fixed over its longitudinal extent by way of corresponding readjusting guide elements or holders.

The method according to the invention is now characterized in that the tubular profile can be subject to deformation over its longitudinal extent in the torsional region by means of the first punch, with a reduction in the tube cross-sectional area in the torsional region, until a torsional region which is deformed in recessed fashion by means of the punch comes to lie by way of its inner wall against the first mandrel, while the outer wall of the torsional region which is deformed in recessed fashion makes contact at one side with the deformation die and at the other side likewise with the first mandrel. After the tubular hollow profile has been deformed in this way, both the first punch and the first mandrels are removed from the reshaped hollow profile, and the reshaped hollow profile is removed from the first deformation die. In this way, a torsional profile in the form of the reshaped hollow profile has already been formed in which the inner and outer walls of the torsional profile are spaced apart from one another not only in the end region but also in the torsional region.

By means of the method according to the invention, a torsional profile has now already been produced which has the desired torsion characteristics in the torsional region. Here, according to the invention, the inner and outer walls of the torsional profile are spaced apart from one another in the torsional region, such that, under torsional loading, said inner and outer walls cannot rub or slide against one another, and thus undesired generation of noise is reliably prevented. In this case, a gap dimension of 5 mm to 50 mm, preferably 10 mm to 20 mm, can be generated between the inner and outer walls of the torsional profile.

The tubular hollow profiles used for the production of such torsional profiles are in this case composed of metal, preferably of a steel, wherein said tubular hollow profiles can be welded in various welding processes such as, for example, HF welding, laser welding, laser hybrid welding, plasma welding, MAG welding or the like. It is however self-evidently also possible for drawn tubes to be used as hollow profiles. Furthermore, the tubular hollow profile may be non-galvanized or, for corrosion protection purposes, galvanized, and may also be curved over its longitudinal extent.

By means of the first mandrels, it is also possible for the ends of the torsional profile to be shaped in accordance with its further processing. For this purpose, it is merely necessary for the first mandrels to be correspondingly shaped in the end region such that said shape can, as the first mandrels are introduced into the tubular hollow profile, be transferred to the ends of said tubular hollow profile. It is additionally also possible for the ends of the hollow profile to be shaped during the deformation of the tube. In particular, it is also possible here for beads to be embossed and holes to be punched, or for other suitable elements to be formed in.

In a first advantageous refinement of the method according to the invention, the reshaped hollow profile that is now already present is deformed once again. For this purpose, the reshaped hollow profile is placed into a second deformation die and is again fixed at the ends and also fixed over its longitudinal extent in the deformation die. The fixing of the ends of the reshaped hollow profile in the second deformation die is however in this case performed by way of in each case one tapering second mandrel which extends as far as the torsional region.

Here, too, it is possible by means of the second mandrels for the ends of the torsional profile to be shaped in accordance with its further processing. For this purpose, it is merely necessary for the second mandrels to be correspondingly shaped in the end regions such that said shape can, as the first mandrels are introduced into the tubular hollow profile, be transferred to the ends of said tubular hollow profile.

The deformation of the reshaped hollow profile over its longitudinal extent in the torsional region is now performed by means of a second punch, with a further reduction in the cross-sectional area of the reshaped hollow profile in the torsional region. The deformation of the reshaped hollow profile may in this case be performed until the inner walls of the torsional profile come to bear against the region of the taper of the second mandrels. In this case, by means of the shape of the taper, the second mandrels can be set in a predetermined spacing of the inner walls and outer walls to one another in the region of the torsional region. The shape of the taper of the second mandrel is thus definitive of the spacing of the inner and outer walls of the torsional profile in the torsional region and thus of an air gap which forms there. After the reshaped hollow profile has then been further deformed in this way, the second punch and the second mandrels are then removed from the further-reshaped hollow profile, and the further-reshaped hollow profile is removed from the second deformation die.

By means of said further method steps, it is now possible for a predetermined spacing of the inner and outer walls of the torsional profile to be produced to be set very precisely to as little as 1 mm. This means that, through the use of different second mandrels with different tapers, the spacings between the inner and outer walls of the torsional profile can be varied. It is thus possible, on one and the same production system, to produce different torsional profiles by exchanging the second mandrels.

In a particularly advantageous refinement of the method according to the invention, as starting profiles, use is made of tubular hollow profiles which are of circular, oval or similar closed cross section. Specifically, it is basically merely necessary that a closed hollow profile is used as a starting profile. Thus, with the method according to the invention, it is possible to produce a multiplicity of different torsional profiles for a wide variety of applications. It is however also conceivable for the tubular hollow profile to have a different cross section and/or outline in its end regions than in the region which is reshaped to form the torsional region of the torsional profile.

It is however particularly advantageous, in particular for automotive applications, for the tubular hollow profile to be deformed so as to form a profile which is V-shaped, U-shaped or of similarly recessed shape in cross section in the torsional region. Such profiles have proven to be particularly suitable specifically for automotive applications, in particular also for safety-relevant applications.

To increase the torsional rigidity of the torsional profile to be produced, it is possible here for both the first and the second mandrels that are used in the method according to the invention to be equipped, at least in sections, with beads which preferably correspond to a corresponding projections of the punches and/or of the deformation dies.

According to a further advantageous concept of the method according to the invention, first and/or second deformation dies are used which are in the form of bottom dies, it preferably also being possible for the first and second deformation dies to be of identical form. Such bottom dies are already well proven for the production of profiles during the deformation, and interact in a particularly effective manner with the punches that are used, such that in this way, the torsional profiles which are of recessed form in the torsional region can be produced in a simple and inexpensive manner. To further minimize the tooling costs, it is particularly advantageous here for a single deformation die which is in the form of a bottom die to be used as first and second deformation die.

In order that the torsional profiles are of particularly uniform design in the torsional region, it has proven expedient if the first mandrels, after being inserted into the tubular hollow profile, extend into the tubular hollow profile over up to one third thereof, preferably as far as the middle, and are particularly preferably held on holders at the end regions of the tubular hollow profile. By means of this measure, it is possible firstly for the first mandrels to be positioned precisely in the tubular hollow profile, whereas secondly, the fact that the tapering first mandrels extend into the tubular hollow profile over up to one third thereof, preferably as far as the middle, ensures that the tubular hollow profile is deformed particularly uniformly in the torsional region.

To again minimize tooling costs and accelerate the production of a torsional profile, it has proven to be advantageous for the same punch to be used as first and second punch. In particular if it is also the case that the first and second deformation die are in the form of a single deformation die, the deformation of the tubular hollow profile and the further deformation of the reshaped hollow profile can be performed in one deformation die and using the same punches.

According to a further advantageous concept of the method according to the invention, regions of the reshaped hollow profile which, during the further deformation, undergo no further deformation or only a small amount of further deformation are provided with readjusting guidance by way of readjusting guide elements. This not only yields gentle processing of said regions, but also ensures that, as a result of the targeted readjusting guidance, the torsional profiles that are produced exhibit only very low tolerance deviations.

According to an independent concept of the invention, protection is also claimed for a torsional profile produced from a tubular hollow profile, which torsional profile is characterized in that it has a torsional region in which outer walls of the torsional profile have, over the entire longitudinal extent of the torsional region, a spacing to inner walls of the torsional profile. Such torsional profiles according to the invention have the torsional characteristics required for the applications, wherein, however, generation of noise under torsional loading is prevented because the inner and outer walls of the torsional profile do not rub against one another or slide against one another in the torsional region.

According to a further particularly advantageous concept of the invention, the torsional profile has a torsional region which is of recessed form and the outer walls of which have, over the entire longitudinal extent of the torsional region, a uniform spacing to inner walls of the torsional region. Here, "uniform" is to be understood to mean that the spacing between the inner walls and the outer walls in the torsional region is constant over the longitudinal extent, wherein, however, the spacing between the inner walls and outer walls does not need to be constant in the cross section perpendicular to the longitudinal extent.

The torsional profile according to the invention is advantageously produced in accordance with the above-described method according to the invention.

Further aims, advantages, features and possible uses of the present invention will emerge from the following description of exemplary embodiments on the basis of the drawings. In this case, all of the features described and/or illustrated in the figures form the subject matter of the present invention individually or in any desired meaningful combination, even independently of their combination in the claims or their back-references.

DETAILED DESCRIPTION

FIGS. 1 to 9 are different illustrations showing the production of an exemplary embodiment of a torsional profile according to the invention by means of the method according to the invention for producing a torsional profile from a tubular hollow profile 1.

Figure 1:
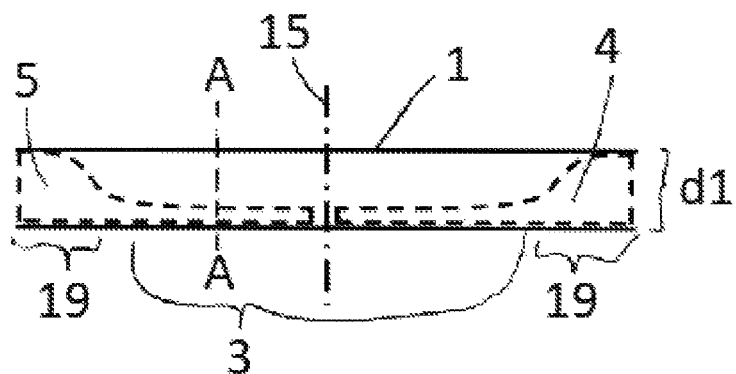
FIG. 1 is a first longitudinal sectional illustration during the production of an exemplary embodiment of a torsional profile according to the invention.
Figure 4:
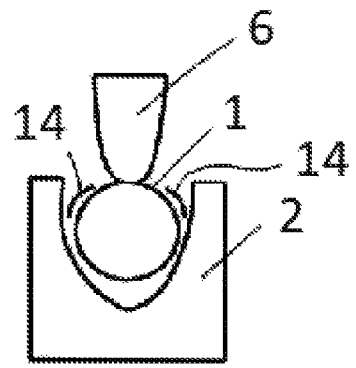
FIG. 4 is a sectional illustration of FIG. 1 along the section plane A-A.
Figure 7:
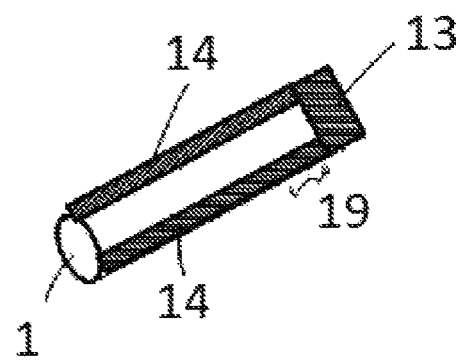
FIG. 7 shows a plan view of a device for producing a torsional profile according to the invention during the production step illustrated in FIG. 1, in a sub-region.

Here, FIGS. 1, 4 and 7 show the same arrangement in different illustrations, in which the tubular hollow profile 1 is already arranged in a deformation die 2 in the form of a bottom die. In this case, it can be seen in particular in FIG. 1 that, also, first mandrels 4, have already been inserted into the tubular hollow profile at the ends 19 thereof. The first mandrels 4, 5 are in this case designed so as to taper toward the middle of the tubular hollow profile 1, indicated by the central axis 15 in FIG. 1. Here, the first mandrels 4, 5 extend in each case almost as far as the middle of the tubular hollow body 1. In this exemplary embodiment, the tubular hollow body 1 has a circular cross section, such that the walls of the tubular hollow profile 1 have an initial spacing $d_1$.

In the cross-sectional illustration as per FIG. 4, it can now be seen that the tubular hollow profile 1, before its deformation, has been placed into the deformation die 2 which is in the form of a bottom die, said tubular hollow profile being securely fixed over its longitudinal extent by the readjusting guide elements 14, which are also simultaneously designed as holders, in the deformation die 2 over its entire longitudinal extent. At the ends, the tubular hollow profile 1 is fixed by the first mandrels 4, 5. FIG. 7 furthermore shows holders 13 by means of which the hollow profile 1, in its end regions 19, is held down during the deformation process.

FIG. 4 furthermore illustrates a punch 6 by means of which the tubular hollow profile 1 is subsequently deformed by virtue of the punch being pushed downward into the deformation die 2. In this way, a recessed profile is generated in the torsional region 3.

FIG. 7 now shows, in a plan view, a sub-region of a device for producing a torsional profile according to the invention, wherein, however, to better illustrate the cross section of the tubular hollow profile, only one half has been illustrated. It is possible here to clearly see the holding-down elements 14 which, in this exemplary embodiment, extend over the longitudinal extent of the entire tubular hollow body 1. It is also possible to clearly see the holders 13 by means of which the hollow profile 1, in the end regions 19, is held down during the deformation process.

Figure 2:
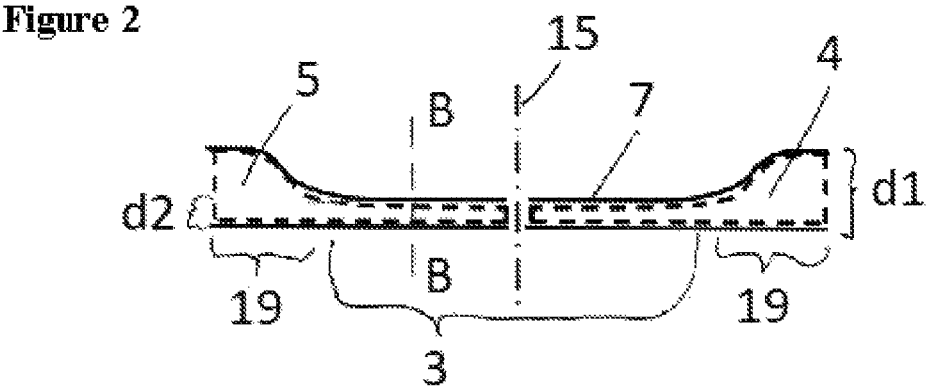
FIG. 2 is a second longitudinal sectional illustration during the production of an exemplary embodiment of a torsional profile according to the invention.
Figure 5:
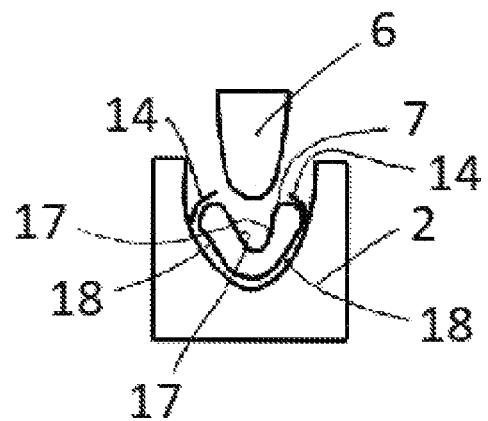
FIG. 5 is a sectional illustration of FIG. 2 along the section plane B-B.
Figure 8:
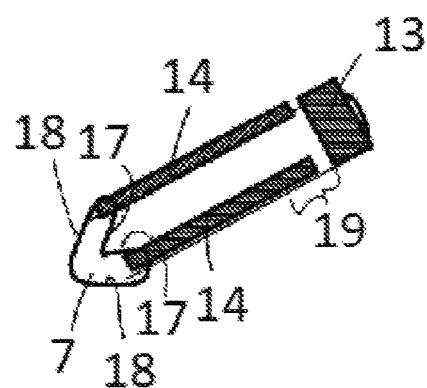
FIG. 8 shows a plan view of a device for producing a torsional profile according to the invention during the production step illustrated in FIG. 2, in a sub-region.
Figure 9:
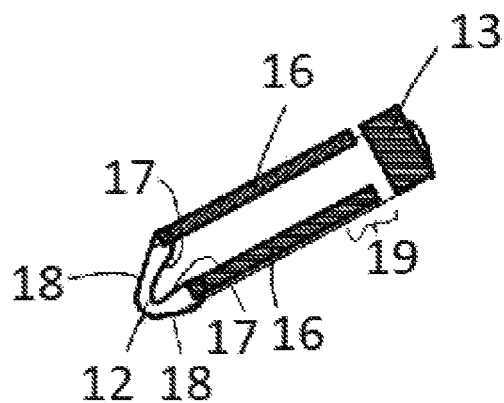
FIG. 9 shows a plan view of a device for producing a torsional profile according to the invention during the production step illustrated in FIG. 3, in a sub-region.

FIGS. 2, 5 and 8 now show the tubular hollow body 1 after its deformation to form the reshaped hollow profile 7. As can be seen in particular from FIG. 2, the hollow profile 1 has been deformed such that the reshaped hollow profile 7 comes to bear against the first mandrels 4 and 5 in the torsional region 3. In this case, the first mandrels 4 and 5 have a considerably smaller thickness in the region of the torsional region 3 than in the end region 19 of the reshaped hollow profile 7. Therefore, in the end region 19, the first mandrels 4 and 5 taper until they assume an approximately constant thickness again in the torsional region 3.

Figure 3:
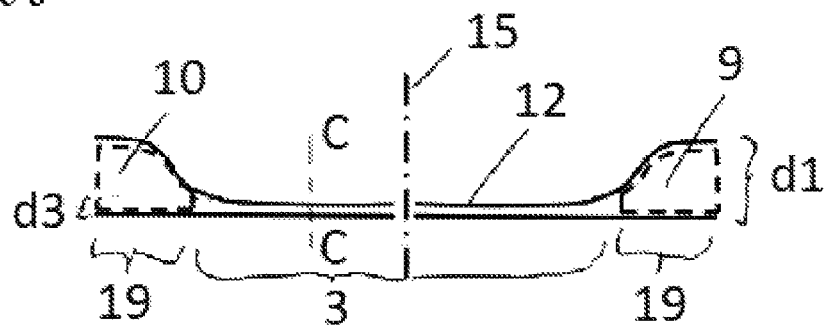
FIG. 3 is a third longitudinal sectional illustration during the production of an exemplary embodiment of a torsional profile according to the invention.

FIG. 5 now shows a sectional illustration along the section plane B-B of FIG. 3, wherein here, the punch 6 is additionally illustrated. Here, it is already possible to clearly see that the originally tubular hollow profile 1 of FIGS. 1, 4 and 7 has been deformed in the torsional region 3 to form a reshaped, substantially V-shaped hollow profile 7, wherein the latter has inner walls 17 and outer walls 18 which are spaced apart in the region of the recess with a spacing $d_2$. Along the outer walls 18 and inner walls 17 in their extent toward the readjusting guide elements 14 in the form of holders, the spacing between the outer walls 18 and the inner walls 17 may also vary, in particular increase, that is to say said spacing does not need to have the constant value $d_2$.

The V-shaped configuration of the reshaped hollow profile 7 can also be seen particularly clearly in FIG. 8.

Although the reshaped hollow profile 7 of FIGS. 2, 5 and 8 already has the desired torsional characteristics, it is then possible in a further method step for the desired spacing $d_3$ between the outer walls 18 and the inner walls 17 in the region of the recess to be precisely set in the torsional region 3. The way in which this is achieved emerges from the illustrations of FIGS. 3, 6 and 9. Specifically, for this purpose, the reshaped hollow profile 7 is arranged in a deformation die, which is likewise in the form of a bottom die, and the ends of said reshaped hollow profile are fixed at the end regions 19 by means of second mandrels 9, 10. It is also the case in the second deformation die 8 that holding-down elements 16 in the form of holders are arranged over the longitudinal extent for fixing purposes. The second mandrels 9, 10 are now formed such that they duly taper, but only in the end region 19, and not into the torsional region 3. In other exemplary embodiments not shown here, it is also possible for the second mandrels 9, 10 to extend into the torsional region 3. Here, the mandrels 9, 10 then serve to calibrate the tube end and furthermore define the end position of the second punch 11 and thus also the dimension of the gap between the outer walls 18 and the inner walls 17 in the region of the recess, or the spacing $d_3$.

Figure 6:
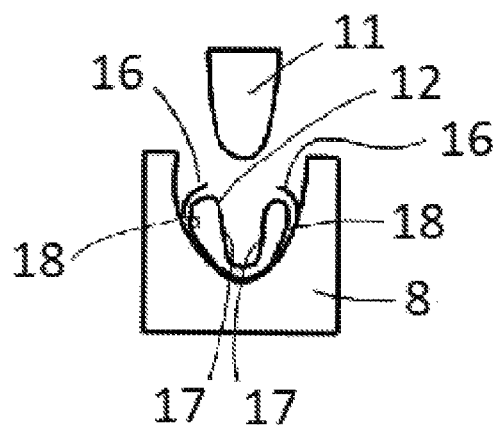
FIG. 6 is a sectional illustration of FIG. 3 along the section plane C-C.

As can be seen in particular from FIG. 6, the reshaped hollow profile 7 is reshaped to form the further-reshaped hollow profile 12 by virtue of a second punch 11 being moved downward into the second deformation die 8, which is in the form of a bottom die, and in the process the reshaped hollow profile 7 being deformed in the torsional region 3 to form the further-reshaped hollow profile 12, this being achieved precisely when the further-reshaped hollow profile 12 comes to bear, in the end region 19, against the taper of the second mandrels 9 and 10. Specifically, it is precisely then that the desired spacing $d_3$ is realized in the recess of the further-reshaped hollow profile 12. During said reshaping process, the upper regions of the further-reshaped hollow profile 12 can be provided with readjusting guidance by means of the holding-down elements, such that particularly gentle processing is realized there during the reshaping process.

As can also be seen in particular from FIG. 6, it is the case in the further-reshaped hollow profile 12 that the spacing between the inner walls 17 and the outer walls 18 is greater in the upper region than in the region of the recess, for said spacing has assumed the desired spacing $d_3$.

After the reshaping of the originally tubular hollow profile 1 to form the further-reshaped hollow profile has been completed, the second punch 11 is then moved out of the second deformation die 8, and the second mandrels 9, 10 are likewise pulled out of the further-reshaped hollow profile 12. It is then possible for the further-reshaped hollow profile 12, as a finished torsional profile, to be removed from the second deformation die 8 and supplied for further use or processing.

It is also pointed out here that the deformation of the originally tubular hollow profile 1 and of the reshaped hollow profile 7 during the movement of the respective punch 6, 11 into the respective deformation die 2, 8 takes the form of ironing and thus strain hardening. Thus, after the removal of the reshaped hollow profile 7 or of the further-reshaped hollow profile 12 from the tool dies 2, 8, only a small degree of spring-back occurs, such that the required spacings $d_2$ and $d_3$ can be produced in a very precise manner.

LIST OF REFERENCE SIGNS

1 Tubular hollow profile
2 First deformation die
3 Torsional region
4 First mandrel
5 First mandrel
6 First punch
7 Reshaped hollow profile
8 Second deformation die
9 Second mandrel
10 Second mandrel
11 Second punch
12 Further-reshaped hollow profile
13 Holder
14 Holding-down element
15 Central axis
16 Readjusting guide element
17 Inner wall
18 Outer wall
19 End region
A-A Section plane
B-B Section plane
C-C Section plane
$d_1$ Initial distance
$d_2$ Distance
$d_3$ Distance

What is claimed is:

1. A method for producing a torsional profile from a tubular hollow profile, the torsional profile being provided, over its entire length, with spaced-apart walls, the method comprising:
    a) placing the tubular hollow profile into a first deformation die,
    b) positioning the ends of the tubular hollow profile in the first deformation die by means of, in each case, a tapering first mandrel which extends into a torsional region,
    c) positioning the tubular hollow profile over its longitudinal extent in the first deformation die,
    d) deforming the tubular hollow profile over its longitudinal extent in the torsional region by means of a first punch, with reduction in the tube cross-sectional area in the torsional region, to produce a reshaped hollow profile,
    e) removing the first punch and the first mandrels,
    f) fixing the ends of the reshaped hollow profile in a second deformation die by means of, in each case, a tapering second mandrel which extends as far as the torsional region,
    g) fixing the reshaped hollow profile over its longitudinal extent in the second deformation die,
    h) deforming the reshaped hollow profile over its longitudinal extent in the torsional region by means of a second punch, with a reduction in the cross-sectional area of the reshaped hollow profile in the torsional region, to produce a further-reshaped hollow profile,
    i) removing the second punch and the second mandrels, and
    j) removing the further-reshaped hollow profile.

2. The method as claimed in claim 1, wherein the deformation of the reshaped hollow profile is performed such that, in the region of the second mandrels, the reshaped hollow profile bears against the taper thereof.

3. The method as claimed in claim 1, wherein, as a starting profile, use is made of a tubular hollow profile which is of circular, oval or variable or similar closed cross section.

4. The method as claimed in claim 1, wherein the tubular hollow profile is deformed so as to form a profile which is V-shaped, U-shaped or similarly shaped in cross section.

5. The method as claimed in claim 1, wherein 1, wherein the first and/or the second mandrels are used which are equipped, at least in sections, with beads.

6. The method as claimed in claim 1, wherein the first and/or the second deformation dies are used which are in the form of bottom dies.

7. The method as claimed in claim 1, wherein the first mandrels, after being inserted into the tubular hollow profile, extend over up to one third of the tubular hollow profile.

8. The method as claimed in claim 1, wherein the first and the second punches are used which are of identical form.

9. The method as claimed in claim 1, wherein regions of the reshaped hollow profile which, during the further deformation, undergo no further deformation or only a small amount of further deformation are provided with readjusting guidance by way of readjusting guide elements.

10. The method as claimed in claim 5, wherein the beads correspond to corresponding projections of the punches and/or of the deformation dies.

11. The method as claimed in claim 6, wherein the first and the second deformation dies are of identical form.

12. The method as claimed in claim 7, wherein the first mandrels, after being inserted into the tubular hollow profile, extend up to the middle of the tubular hollow profile.

\* \* \* \* \*